US006819241B2

(12) United States Patent
Turner et al.

(10) Patent No.: US 6,819,241 B2
(45) Date of Patent: Nov. 16, 2004

(54) SYSTEM AND METHOD FOR SCANNING INDIVIDUALS FOR ILLICIT OBJECTS

(75) Inventors: John B. Turner, El Paso, TX (US); Brian J. Turner, El Paso, TX (US); Les R. Burk, El Paso, TX (US)

(73) Assignee: Ranger Security Detectors, Inc., El Paso, TX (US)

( * ) Notice: Subject to any disclaimer, the term of this patent is extended or adjusted under 35 U.S.C. 154(b) by 0 days.

(21) Appl. No.: 10/269,809

(22) Filed: Oct. 10, 2002

(65) Prior Publication Data

US 2003/0137420 A1 Jul. 24, 2003

Related U.S. Application Data

(60) Provisional application No. 60/328,836, filed on Oct. 11, 2001, and provisional application No. 60/328,691, filed on Oct. 10, 2001.

(51) Int. Cl.[7] .............................................. G08B 13/24
(52) U.S. Cl. ....................... 340/551; 340/552; 340/561; 340/572.2; 324/217; 324/260; 324/239; 324/243
(58) Field of Search ................................ 340/551, 552, 340/561, 572.2; 324/217, 260, 239, 243

(56) References Cited

U.S. PATENT DOCUMENTS

| 3,676,772 | A | * | 7/1972 | Lee | 324/233 |
|---|---|---|---|---|---|
| 4,384,281 | A | | 5/1983 | Cooper | 340/572 |
| 5,414,411 | A | * | 5/1995 | Lahr | 340/551 |
| 5,521,583 | A | | 5/1996 | Frahm et al. | 340/551 |
| 5,680,103 | A | | 10/1997 | Turner et al. | 340/551 |
| 5,721,489 | A | * | 2/1998 | Weaver et al. | 324/329 |
| 5,726,628 | A | * | 3/1998 | Yoo | 340/551 |
| 5,790,685 | A | | 8/1998 | Sallee | 382/100 |
| 6,362,739 | B1 | * | 3/2002 | Burton | 340/572.6 |

OTHER PUBLICATIONS

PCT Invitation to Pay Additional Fees (PCT Article 17(3)(a) and Rule 40.01, mailed Feb. 2, 2003, re PCT/US 02/32720 (6 pages).

* cited by examiner

Primary Examiner—Thomas J Mullen, Jr.
Assistant Examiner—Tai T. Nguyen
(74) Attorney, Agent, or Firm—Baker Botts L.L.P.

(57) ABSTRACT

A system and method for scanning individuals for illicit objects include the ability to scan a wheeled user transport device and an individual being transported thereby for metallic objects and to determine whether an illicit object may be present, without activating an alarm for the user transport device while detecting illicit objects on the individual.

44 Claims, 4 Drawing Sheets

SYSTEM AND METHOD FOR SCANNING INDIVIDUALS FOR ILLICIT OBJECTS

RELATED APPLICATIONS

This application claims the benefit of U.S. Provisional Application No. 60/328,691, filed Oct. 10, 2001, and U.S. Provisional Application No. 60/328,836, filed Oct. 11, 2001.

TECHNICAL FIELD OF THE INVENTION

The invention relates to object scanning and, more specifically, to a system and method for scanning individuals for illicit objects.

BACKGROUND OF THE INVENTION

Illicit object detection systems have become increasingly used in today's society. The most well-known type of such systems is the walk-through metal detector commonly seen in airports, schools, government buildings, and industrial facilities. This type of detection system typically tries to detect metallic objects, such as guns, knives, and/or precious metals, upon individuals passing through the system.

Unfortunately, physically-challenged individuals are often confined to wheelchairs, which may not pass through this type of detection system because they are too large and/or generate too many false alarms due to their composition to be of any practical use. Accordingly, wheelchair-bound individuals must be scanned with hand-held scanners, which also have problems with detection due to the composition of the wheelchairs, and/or scanned by physical touch, which is invasive to personal privacy. Moreover, these scans may take a relatively long period of time, which may slow the processing of individuals through a security checkpoint. Furthermore, for very sensitive scans, the wheelchair-bound individuals must be removed from the wheelchair, which is quite cumbersome, invasive, and fraught with the potential for bodily injury.

SUMMARY OF THE INVENTION

The present invention provides systems and methods that substantially reduce and/or eliminate at least some of the disadvantages with the prior art. Accordingly, at least in certain embodiments, the present invention provides a system and method that can effectively scan individuals in wheelchairs for illicit objects without having to remove the individuals from the wheelchairs.

In certain embodiments, a system for scanning individuals for illicit objects includes a wheeled user transport device and a metal detector. The wheeled user transport device includes a frame, wheels coupled to the frame, and a user support coupled to the frame. The metal detector is operable to scan the transport device without activating an alarm while being able to detect an illicit object on an individual being transported thereby.

In particular embodiments, a system for scanning individuals for illicit objects includes a wheeled user transport device including a frame, wheels coupled to the frame, and a user support coupled to the frame, wherein the transport device may be scanned by a metal detector without activating an alarm, but an illicit object on an individual being transported by the transport device may be detected.

In some embodiments, a method for scanning individuals for illicit objects includes receiving a signal representative of a metallic object and determining whether the represented metallic object is potentially illicit. The method also includes determining whether the represented metallic object is associated with a wheeled user transport device and initiating an alarm if the represented metallic object is potentially illicit and is not associated with a wheeled user transport device.

In particular embodiments, a method for scanning individuals for illicit objects includes scanning a wheeled user transport device and an individual being transported thereby for metallic objects and determining whether an illicit object may be present. The method also includes scanning, if an illicit object may be present, a portion of the transport device and the individual for metallic objects and determining whether an illicit metallic object may be present in the scanned portions.

In certain embodiments, a method for scanning individuals for illicit objects includes scanning a wheeled user transport device and an individual being transported thereby for metallic objects and determining whether an illicit object may be present, wherein the transport device may be scanned without activating an alarm, but an illicit object on the individual may be detected.

The present invention has a variety of technical features. For example, in certain embodiments, whether an illicit object may be present on an individual transported by a wheelchair may be determined without having to remove the individual from the wheelchair, which reduces scanning time and invasiveness to the individual. As another example, in certain embodiments, a potential illicit object on an individual transported by a wheelchair may be located without having to remove the individual from the wheelchair, which also reduces scanning time and invasiveness to the individual. Additionally, an individual may be transported throughout a facility in one wheelchair without having to be removed, which reduces risk of injury to the individual. As a further example, in some embodiments, the wheelchair may be composed of some metallic components, which may provide for stronger wheelchairs. As another example, in particular embodiments, a metal detector may be up to approximately thirty-six inches wide, which will allow larger wheelchairs and other larger wheeled user transport devices to pass.

Of course, some embodiments may possess none, one, some, or all of these technical features and/or additional technical features. Other technical features will be readily apparent to those skilled in the art from the following figures, detailed written description, and claims.

BRIEF DESCRIPTION OF THE DRAWINGS

The drawings described below provide a more complete understanding of the present invention and of its technical features, especially when considered in light of the following detailed written description.

DETAILED DESCRIPTION OF EMBODIMENTS OF THE INVENTION

Figure 1:
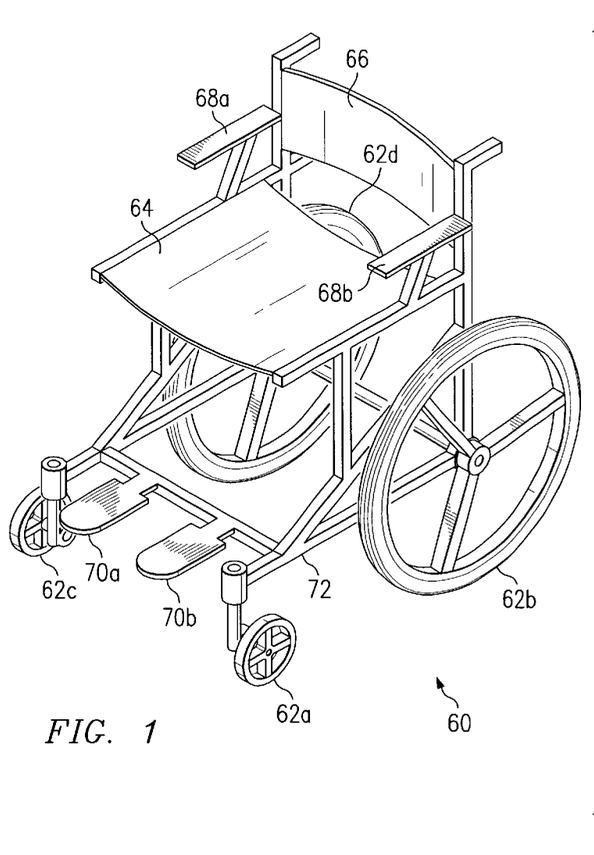
FIG. 1 illustrates a system for scanning individuals for illicit objects in accordance with one embodiment of the present invention.

FIG. 1 illustrates a system 10 for scanning individuals for illicit objects in accordance with one embodiment of the present invention. In general, system 10 includes a metal detector 20 and a wheelchair 60. Metal detector 20 and wheelchair 60 are designed to work together so that an individual being transported by wheelchair 60 does not have to be removed therefrom to be scanned for illicit objects.

In more detail, metal detector 20 includes a platform 30 and a metal detection system 40. In operation, metal detector 20 is operable to detect metallic objects on an individual being transported by wheelchair 60 while not activating an alarm for wheelchair 60. Of course, if an illicit object has been incorporated into or onto wheelchair 60, metal detector 20 may detect the object even though it is part of the wheelchair.

Platform 30 includes sidewalls 32 and a base 34, which form a passage 36 through which wheelchair 60, along with the transported individual, passes for scanning. As shown, sidewalls 32 are approximately four feet tall, although they may be of any appropriate height, and are spaced approximately thirty-two inches apart. In particular embodiments, sidewalls 32 may be up to approximately thirty-six inches apart. Between sidewalls 32 is base 34, through which cables may run between the sidewalls. As illustrated, base 34 provides one and one-half inches of clearance underneath, although any other appropriate clearance could be used. Platform 30 could be made of plastic, wood, composite, metal, and/or any other appropriate material.

Metal detection system 40 includes a metal detection subsystem 42, a processing subsystem 48, and an alarm subsystem 54 coupled to platform 30. These subsystems may be coupled by any appropriate type of wireline, fiber-optic, or wireless links.

Metal detection subsystem 42 has two portions—first portion 42l, housed in sidewall 32l, and second portion 42r, housed in sidewall 32r. Metal detection subsystem 42 is operable to sense a metallic object passing through passage 36 and to form a signal representative thereof. Note that the signal may not completely characterize the sensed object.

In particular embodiments, metal detection subsystem 42 may include magnetic field generators and magnetic field detectors. The magnetic field generators and the magnetic field detectors may work in concert with each other to detect metallic objects by, for example, continuous-wave or pulse techniques. Continuous-wave techniques usually have magnetic field generators and magnetic field detectors mounted in each of sidewalls 32 and operate in the 6–12 kilohertz (kHz) range. Pulse techniques, in contrast, usually have magnetic field generators mounted in one of sidewalls 32 and magnetic field detectors mounted in the other of sidewalls 32 and operate in the 1–50 kHz range. In other embodiments, metal detection subsystem 42 may include magnetometers, although this may limit detection to ferrous objects.

Processing subsystem 48 is operable to analyze signals representing sensed objects to determine whether an illicit object may be present. An illicit object may present, for example, if the size of a signal exceeds a threshold, if a signal indicates that a certain composition of metal is present, and/or if a signal matches a profiled signature. If an illicit object may be present, processing subsystem 48 initiates an alarm by alarm subsystem 54. This may be accomplished, for example, by generating an appropriate signal for alarm subsystem 54. Processing subsystem 48 may include a digital processor, such as, for example, a microprocessor, a field programmable gate array (FPGA), an application specific integrated circuit (ASIC), or any other type of device for manipulating data in a logical manner, memory, such as, for example, read-only memory (ROM), random-access memory (RAM), compact-disk read-only memory (CD-ROM), registers, or any other type of electromagnetic or optical volatile or non-volatile data storage device, and/or an analog processor, which could include operational amplifiers, resistors, capacitors, inductors, filters, or any other appropriate type of analog component.

Alarm subsystem 54 generates a user intelligible signal in response to a prompt from processing subsystem 48. Alarm subsystem 54 may generate a visual alarm with a visual portion and/or an acoustic alarm with an acoustic portion. The visual portion may include a cathode ray tube (CRT) display, a liquid crystal display (LCD), an LED display, and/or any other appropriate type of device for generating visual information. The acoustic portion may include a bell, a buzzer, a speaker, a siren, and/or any other appropriate type of device for generating an audible signal. The alarm subsystem may also generate an indication of the size, composition, and/or location of the potentially illicit object.

Wheelchair 60 includes wheels 62, a horizontal user support 64, a vertical user support 66, lateral user supports 68, lower user supports 70, and a frame 72, to which the aforementioned components are coupled. As illustrated, frame 72 is composed of a number of struts. In other embodiments, however, frame 72 may be composed of any appropriate structural elements in any appropriate configuration. Wheels 62, horizontal user support 64, vertical user support 66, lateral user supports 68, lower user supports 70, and frame 72 may be composed of plastic, urethane, composite, carbon filled plastic, fiberglass, wood, metal, and/or any other appropriate material. For instance, wheelchair 60 may be composed entirely of non-metallic materials. In particular embodiments, for example, wheelchair 60 may be composed of carbon fiber composites and have nylon bearings. In other embodiments, however, wheelchair 60 may include small amounts of metallic materials, such as bolts, nuts, axles, ball bearings, and/or other appropriate components, possibly made of titanium. But regardless of composition, wheelchair 60 is able to pass through metal detector 20 without activating an alarm while still allowing illicit objects to be detected. In particular embodiments, wheelchair 60 is sized to pass through a standard metal detector, which typically has a passage width of between approximately thirty and thirty-two inches. Wheelchair 60 may be collapsible or non-collapsible.

In operation, an individual may be placed in wheelchair 60, and wheelchair 60, along with the individual, may be maneuvered through passage 36 of metal detector 20. While in passage 36, wheelchair 60 and the individual are scanned for illicit objects by metal detection subsystem 42. Metal detection subsystem 42, however, may not detect wheelchair 60, especially if wheelchair 60 is composed essentially of non-metallic components. Results of this scanning are sent to processing subsystem 48, which determines whether an illicit object may be present. If wheelchair 60 is detected by metal detection subsystem 42, processing subsystem 48 may able to ignore results associated with wheelchair 60. If processing subsystem 48 determines that an illicit object may be present, the subsystem initiates an alarm signal by alarm subsystem 54. Upon activation of an alarm, the individual in wheelchair 60 may be scanned with a localized metal detector or by hand.

The embodiment of the invention illustrated by system 10 has a variety of technical features. For example, determining whether an illicit object may be present on an individual in a wheelchair may be accomplished without removing the individual from the wheelchair, which reduces scanning time and invasiveness to the individual. As another example, an individual may be transported throughout a facility in one wheelchair without having to be removed, which reduces risk of bodily injury to the individual. A variety of other examples exist.

Although system 10 illustrates one embodiment of the present invention, other embodiments may have fewer, more, and/or a different arrangement of components and/or fewer or more features. For example, in certain embodiments, platform 30 may not include base 34 and/or may include a top. As another example, metal detection system 40 may be located only in one of sidewalls 32, in base 34, or at any other appropriate location. In certain embodiments, a control subsystem may also be included to allow a user to input commands to the system. As a further example, objects that are known not to be illicit, such as, for example, coins, keys, or other appropriate items, may be filtered. As an additional example, wheelchair 60 may have any of a variety of configurations. A variety of other examples exist.

In particular embodiments, metal detector 20 may be coupled to a communication network—wireline, fiber-optic, wireless, or otherwise—for remote control and/or monitoring. Any of a variety of aspects of metal detector 20 may be controlled and/or monitored remotely. For example, throughput and false alarm rates may be monitored, and the sensitivity of metal detection system 40 adjusted accordingly. Furthermore, a variety of systems similar to system 10 may be controlled and/or monitored remotely. Additionally, some of the components of the metal detector, such as processing subsystem 48 or alarm subsystem 54, may be located remotely.

Figure 2:
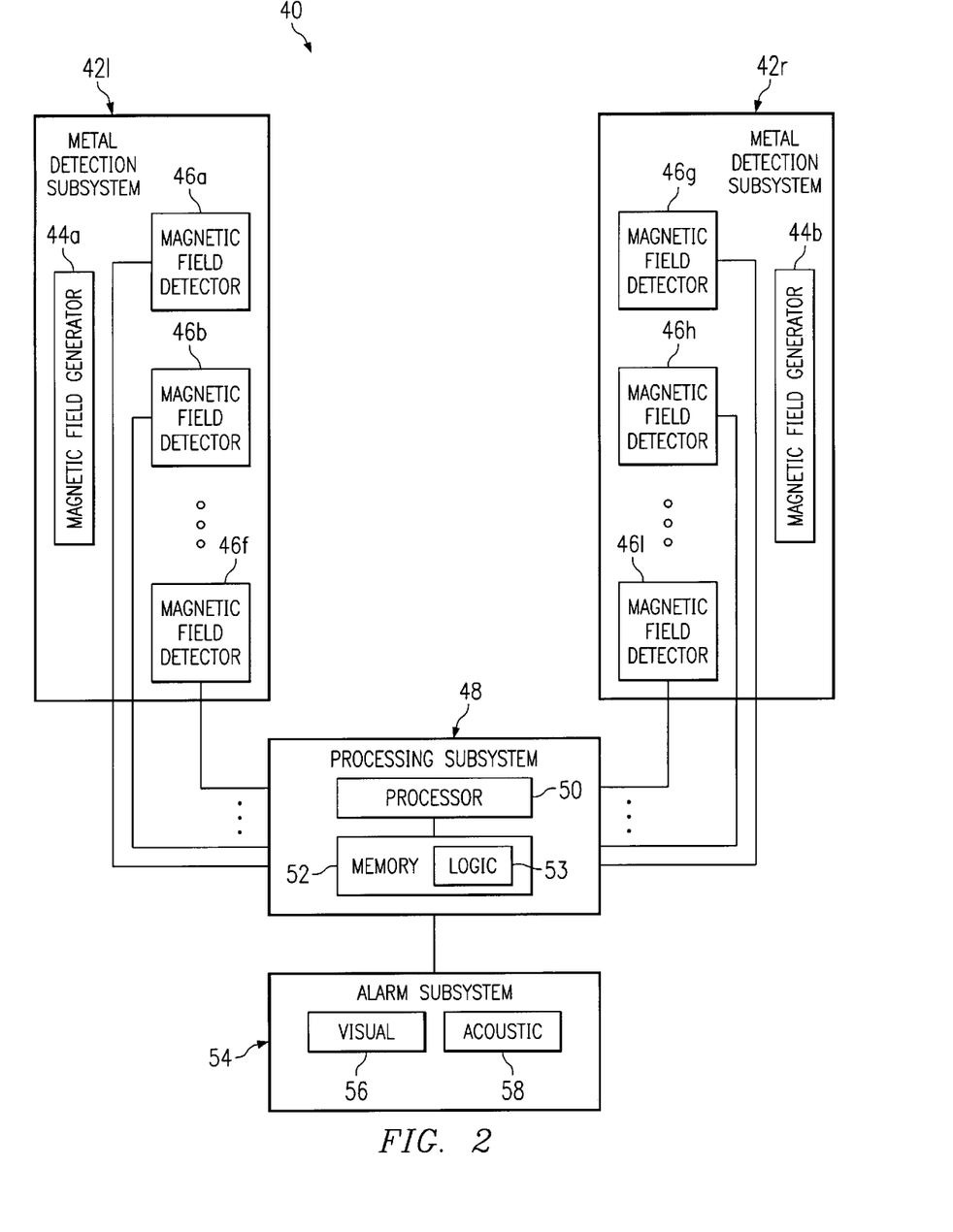
FIG. 2 is block diagram of one embodiment of components for the system of FIG. 1.

FIG. 2 is a block diagram of one embodiment of components for metal detection system 40 of system 10. In this embodiment, system 40 is a multi-zone metallic object detection system.

As illustrated, this embodiment of metal detection system 40 includes a magnetic field generator 44a and magnetic field detectors 46a–f in first portion 42l of metal detection subsystem 42 and a magnetic field generator 44b and magnetic field detectors 46g–l in second portion 42r of metal detection subsystem 42. Magnetic field generators 44 may be any appropriate type of device for generating a magnetic field, such as, for example, a coil of wire coupled to an oscillator. Magnetic field detectors 46, in turn, sense disturbances in the magnetic field generated by magnetic field generators 44, each detector 46 corresponding to a zone of passage 36. Magnetic field detectors 46 may be any appropriate type of device for sensing disturbances to a magnetic field and forming a signal representative thereof, such as, for example, coils of wire coupled to detector circuits, which may include filters, amplifiers, and a detector. As illustrated, there are twelve detectors; thus, twelve zones are available. In certain embodiments, however, the signals from corresponding horizontal detectors may be compared to produce a center zone, resulting in eighteen zones.

Coupled to each of magnetic field detectors 46 is processing subsystem 48. Processing subsystem 48 includes a processor 50 that operates according to a set of logic 53 encoded in a memory 52, which is a type of computer-readable media. Processor 50 is operable to analyze signals, possibly after being digitized, from detectors 46 to determine if an illicit object may be present and in which of the zones the illicit object is likely to be present. Processor 50 may accomplish this, for example, by taking the cube root of the signal from each detector, redundantly multiplying the rooted signals, cross differentiating the multiplied signals, determining the object metal mass in each zone, and comparing the mass in each zone to a predetermined sensitivity threshold to determine if any sensed object has sufficient metal mass to be an illicit object. Processor 50 may initiate an alarm for each potential illicit object individually if multiple illicit objects may be present, a general alarm if any illicit objects may be present, or any other combination. Additionally, processor 50 may perform further filtering of the signals, such as filtering out signals that occur in all zones, typically caused by noise bursts.

Alarm subsystem 54 is coupled to processing subsystem 48 and includes a visual portion 56 and an acoustic portion 58. Visual portion 56 is operable to indicate if an illicit may be present and a zone in which the illicit object may be present. To accomplish this, visual portion 56 may illuminate a portion of a grid—in an LED array, on a CRT display, or on any LCD, for example—wherein each portion corresponds to a zone, provide a textual indication of where the illicit object may be present, or otherwise communicate a location to a user. Acoustic portion 58, in turn, is operable to generate an audible signal indicating that an illicit object may be present.

In operation, when a metallic object passes through this embodiment of metal detector 20, a shift occurs in the amplitude and/or phase of the magnetic field generated by magnetic field generators 44. Note that the metallic object could be on or in the wheelchair itself. The disturbance is sensed by magnetic field detectors 46, which form an electrical signal in response thereto. The signal may then be processed by being amplified, filtered for upper harmonics and/or noise, and detected. After this, the signal may be digitized, by detectors 46 or processing subsystem 48, and again filtered for noise. Then, the digitized signal may be processed according to logic 53 to determine whether an illicit object may be present. If processing subsystem 48 determines that an illicit object may be present, alarm subsystem 54 may generate an appropriate alarm.

The embodiment of system 10 illustrated by FIG. 2 has several technical features. For example, by being able to sense metallic objects on a zoned basis, lumping of metal objects together may be avoided, which may prevent false alarms due to lumping of objects from different locations together. As a further example, by being able to provide an indication of where an illicit object may be present, the scanning process for individuals identified as possibly having an illicit object may be accelerated. As another example, by having zones, the metal detector may be able to filter components of a wheelchair that contain metal. For instance, the logical instructions may instruct the processor to filter the signals from the magnetic field detectors based on zones. Thus, a different filter may be implemented for the zone through which wheels 62 of wheelchair 60 pass, the zone through which horizontal user support 64 passes, the zone through which lateral user supports 68 pass, and the zone through which the head of the individual in wheelchair 60 passes, for example. The filters could be based on size, composition, and/or type of object. Thus, a wheelchair in accordance with the invention may contain some metal, which may provide for stronger and/or more useful wheelchairs. As a further example, the metal detector may be up to approximately thirty-six inches wide, which will allow larger wheelchairs to pass. As an additional example, the technical features already mentioned for system 10 are also available. A variety of other features exist.

Although FIG. 2 illustrates one embodiment of components for metal detection system 40 of system 10, other embodiments may have fewer, more, and/or a different arrangement of components and/or fewer or additional features. For example, metal detection subsystem 42 may contain any number of magnetic field generators and/or magnetic field detectors. As an additional example, alarm subsystem 54 may contain either a visual portion or an acoustic portion. As another example, processor 50 may also determine an estimate of the size of the detected object based on the strength of the signal produced by the object, and alarm subsystem 54 may display an indication of the size. In particular embodiments, the type of metal of which a sensed object is composed may also be determined and, if desired, displayed. As another example, processing subsystem 48 may control the magnetic field generators, regulating their power, frequency, phase, and/or any other appropriate operating parameter. A variety of other examples exist.

Figure 3:
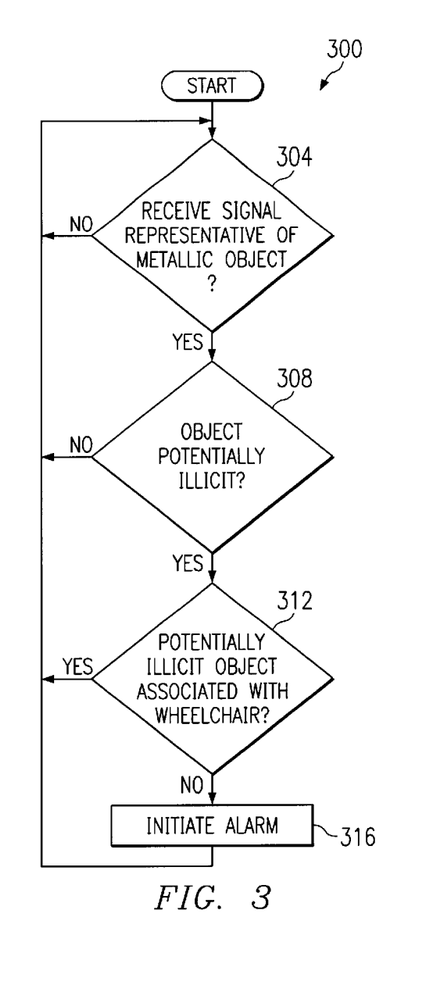
FIG. 3 is a flowchart illustrating a method for scanning individuals for illicit objects in accordance with one embodiment of the present invention.

FIG. 3 is a flowchart 300 illustrating a method for scanning individuals for illicit objects in accordance with one embodiment of the present invention. The method begins at decision block 304 with waiting to receive a signal representative of a metallic object. Such a signal could originate from a metal detection subsystem such as metal detection subsystem 42 of system 10, for example. Note that the signal does not have to completely characterize the object.

Once such a signal has been received, the method calls for determining whether the represented object may be illicit at decision block 308. This determination may be made, for example, by determining the size of the represented object, the composition of the represented object, and/or any other appropriate indicia of an object that may be derived from the signal. If the object is not illicit, the method calls for returning to decision block 304.

If, however, the object may be illicit, the method calls for determining whether the potentially illicit object is associated with a component of a wheelchair at decision block 312. Such a determination may be made, for example, by comparing the received signal to a representation of a signal for a component of a wheelchair and determining if they are similar. Moreover, in certain embodiments, the zone of the metal detector from which the received signal originated could be examined. If the potentially illicit object is associated with a component of a wheelchair, the method calls for returning to decision block 304.

If, however, the potentially illicit object is not associated with a component of a wheelchair, the method calls for initiating an alarm at function block 316. This may be accomplished, for example, by sending an appropriate signal to an alarm subsystem such as alarm subsystem 54.

While flowchart 300 illustrates a method for scanning individuals for illicit objects in accordance with one embodiment of the present invention, other embodiments may contain fewer, more, and/or a different arrangement of operations. For example, in some embodiments, determining whether a potentially illicit object is associated with a component of a wheelchair may occur before determining whether an object may be illicit. As an additional example, certain embodiments may not include decision block 312. As another example, in particular embodiments, the potentially illicit object may be scanned for further by the use of a localized metal detection system or by hand. As another example, determining whether an object may be illicit may include determining a zone in which the object may be present. A variety of other examples exist.

Figure 4:
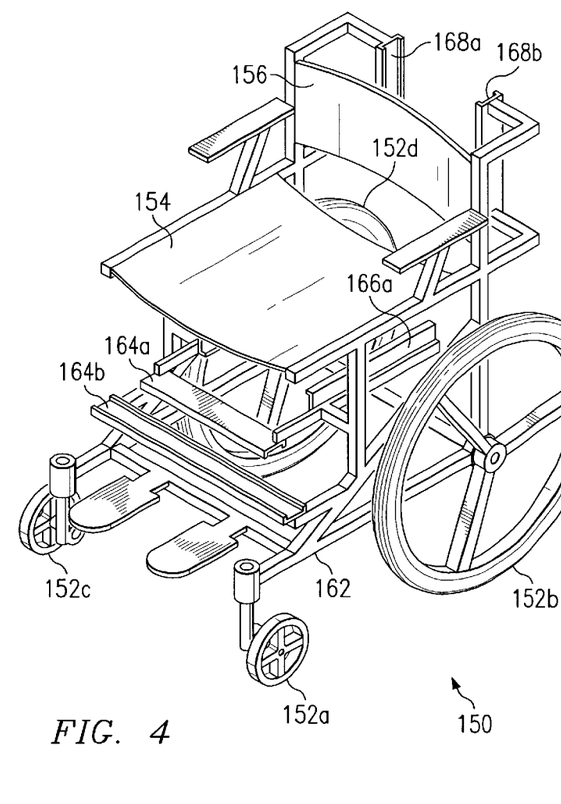
FIG. 4 illustrates a system for scanning individuals for illicit objects in accordance with another embodiments of the present invention.

FIG. 4 illustrates a system 100 for scanning individuals for illicit objects in accordance with another embodiment of the present invention. As with system 10, system 100 includes a metal detector 110 and a wheelchair 150. Also as with system 10, metal detector 110 includes a platform 120, which has a passage 126, and a metal detector system 130, which includes a metal detection subsystem 132, a processing subsystem 138, and an alarm subsystem 144. Additionally, wheelchair 150 includes wheels 152, a horizontal user support 154, a vertical user support 156, and a frame 162. In this embodiment, however, metal detector system 130 includes a localized metal detection subsystem 149, and wheelchair 150 includes guide sets 164, 166, 168 to orient subsystem 149 appropriately with respect to wheelchair 150, and, hence, an individual being transported thereby.

In more detail, subsystem 149 is a hand-held metal detection unit in this embodiment. Thus, at least in this embodiment, subsystem 149 is operable to detect metallic objects at a variety of locations and/or orientations. Subsystem 149 may, for example, include a magnetic field generator, which could include a coil of wire coupled to an oscillator, for instance, and a magnetic field detector, which could include a coil of wire coupled to a detector circuit, for instance. When subsystem 149 is active, it senses disturbances in a localized magnetic field and forms signals representative thereof. The signals formed due to the disturbances are sent, possibly after being amplified, filtered, and/or digitized, to processing subsystem 138, which could be coupled thereto by any appropriate link. Processing subsystem 138 determines whether an illicit object may be present. Note that processing subsystem 138 may or may not have different algorithms to perform for signals from subsystem 149 versus signals from metal detection subsystem 132. Moreover, subsystem 149 may or may not have its own processor in processing subsystem 138. Additionally, subsystem 149 may or may not have its own alarm portions in alarm subsystem 144.

Guide sets 164, 166, 168 of wheelchair 150, in turn, orient subsystem 149 with respect to wheelchair 150, and, hence, an individual transported thereby. Thus, guide set 164 orients subsystem 149 with respect to the lower legs of an individual, guide set 166 orients subsystem 149 with respect to the upper legs of an individual, and guide set 168 orients subsystem 149 with respect to the torso of an individual. Guide sets 164, 166, 168 may be composed of leather, plastic, vinyl, composite, wood, and/or any other nonmetallic material. Additionally, guide sets 164, 166, 168 may contain slots, grooves, channels, or any other type of shape for orienting subsystem 149.

In operation, an individual may be placed in wheelchair 150, and the wheelchair, along with the individual, may be maneuvered into passage 126 of metal detector 110 for scanning. Then, it may be determined whether an illicit object may be present on the individual. This analysis may or may not include using zones and/or filtering of components of wheelchair 150. If an illicit object may be present, the individual transported by wheelchair 150 may be scanned with subsystem 149 by orienting it successively with guide sets 164, 166, 168. During this scanning, if it is again determined that an illicit object may be present, the individual may be scanned by physical touch in the proximity of the guides at which it the determination was made.

System 100 has a variety of technical features. For example, the guide sets offer an advantage over traditional hand-held scanning of an individual in a wheelchair because they provide a more uniform response, due to subsystem 149 being more consistently about the same distance from the individual being scanned. Thus, variations in scanning due to the distance from the individual being scanned are reduced, allowing an increase in detections of illicit objects and/or a decrease in false alarms. Additionally, by being able to scan an individual effectively for metallic objects with a metal detector, the portion of an individual to be scanned by hand if it is determined that a potential object may be present may be reduced, leading to less invasiveness to the individual. A variety of other features exist.

Although system 100 illustrates one embodiment of the present invention, other embodiments may contain less, more, and/or a different arrangement of components and/or fewer or more features. For example, in particular embodiments, wheelchair 150 may include less than all of guide sets 164, 166, 168 and/or additional guide sets. Note that in some embodiments, only one guide is required in a set to orient subsystem 149 for a particular portion of wheelchair 150. Moreover, in some embodiments, no guide sets are used. As another example, in certain embodiments, subsystem 149 may contain slots, grooves, channels, or any other type of shape for interfacing with the guide sets to orient the subsystem with respect to wheelchair 150. In particular embodiments, the guides could be or include pockets or pouches, which could be made of plastic, vinyl, or any other appropriate material, into which a subsystem such as subsystem 149 may be inserted for orientation. In certain embodiments, wheelchair 150 may be used to exclusion of metal detector 110. In some of these embodiments, localized metal detection subsystem 149 may be independent of metal detector 110, in which case it would probably have its own processing subsystem and alarm subsystem. In others of these embodiments, localized metal detection subsystem 149 may be coupled to wheelchair 150 and include a processing subsystem and alarm subsystem. A variety of other examples exist.

Figure 5:
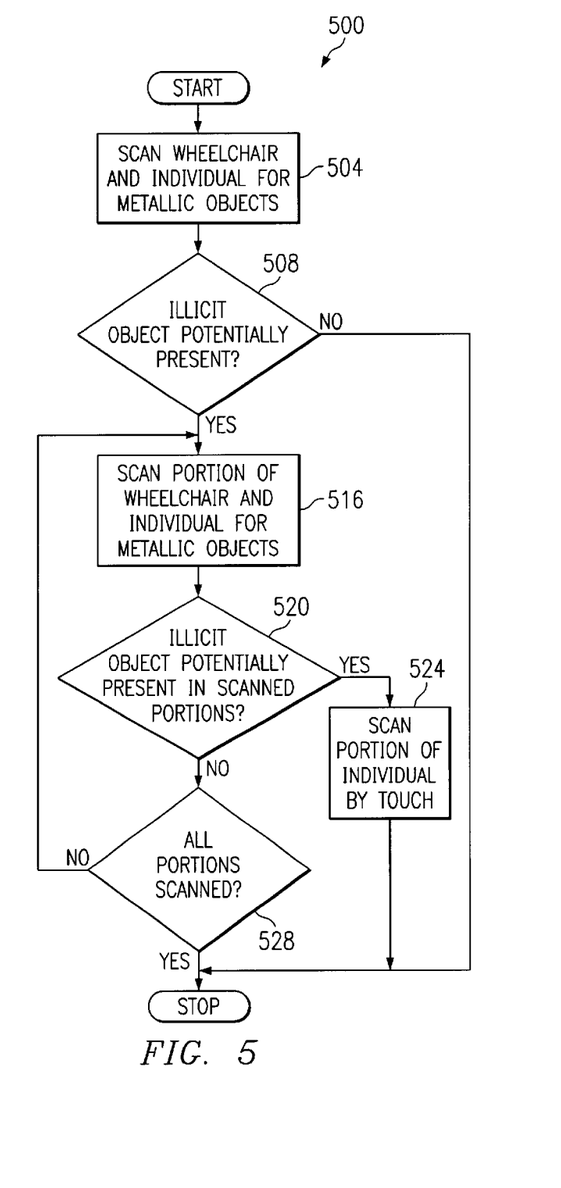
FIG. 5 is a flowchart illustrating a method for scanning individuals for illicit objects in accordance with one embodiment of the present invention.

FIG. 5 is a flowchart 500 illustrating a method for scanning individuals for illicit objects in accordance with one embodiment of the present invention. The method begins at function block 504 with scanning a wheelchair and an individual being transported thereby for metallic objects. Such scanning could be performed, for example, by metal detection subsystem 132 of system 100. At decision block 508, the method calls for determining whether an illicit object may be present. This could be accomplished, for example, by determining that no signals representative of metallic objects exist and/or that those that do exist do not exceed a threshold. If an illicit object is not present, the method is at an end.

If, however, an illicit object may be present, the method calls for scanning a portion of the wheelchair and the transported individual for metallic objects at function block 516. This may be accomplished, for example, by a localized metal detection subsystem such as localized metal detection subsystem 149 of system 100.

After this, the method calls for determining whether an illicit object may be present in the scanned portions at decision block 520. This could be accomplished, for example, by determining that no signals representative of metallic objects exist and/or that those that do exist do not exceed a threshold. If an illicit object may be present, the method calls for scanning the scanned portion of the individual by touch at function block 524. The method is then at an end.

If, however, an illicit object is not present for the scanned portion of the wheelchair and the individual, the method calls for determining whether all portions of the wheelchair and the individual have been scanned at decision block 528. If all portions have been scanned, the method is at an end. If, however, all portions have not been scanned, the method calls for returning to function block 516 to scan another portion of the wheelchair and the individual for metallic objects.

While flowchart 500 illustrates a method for scanning individuals for illicit objects in accordance with one embodiment of the present invention, other embodiments may contain fewer, more, and/or a different arrangement of operations. For example, in some embodiments, the scanning may commence at function block 516. As another example, in certain embodiments, the scanning of portions may continue after function block 524. As an additional example, in particular embodiments, the determination at decision block 508 may include determining a zone in which the potential illicit object may exist, which may be used to select which portions of the wheelchair and individual to scan. The scanning at function block 516 may have a similar feature in certain embodiments. As a further example, when it is determined that an illicit object may be present, an alarm may be initiated. Moreover, further scans may be conducted in response to the alarms. A variety of other examples exist.

The system and method of the present invention have a wide range of applicability. For example, they may be useful for security in the air traffic industry or for controlling theft from industrial companies. As another example, the wheelchair component may have applicability in the medical field as a tool in medial care facilities attempting to produce x-rays without interference. Moreover, the invention is generally useful with any other type of wheeled user transport device, such as, for example, a gurney or a cart.

Although a variety of embodiments have been discussed for the present invention, the invention should be measured by the appended claims. Additionally, those skilled in the art will readily recognize a variety of additions, deletions, modifications, and substitutions that may be made to the illustrated embodiments. Accordingly, the appended claims are intended to include those additions, deletions, modifications, and substitutions to the extent that they do not do violence to the language therein.

What is claimed is:

1. A system for scanning individuals for illicit objects, comprising:
   a wheeled user transport device, comprising:
      a frame,
      wheels coupled to the frame, and
      a user support coupled to the frame;
   a metal detector operable to scan the transport device without activating an alarm while being able to detect an illicit object on an individual being transported thereby;
   a metal detection subsystem operable to detect the presence of metallic objects;
   a processing subsystem operable to determine whether an illicit object may be present;
   the metal detection subsystem comprises a plurality magnetic field detectors, each detector corresponding to a zone of the metal detector; and
   the processing subsystem is operable to determine a zone in which an illicit object may be present and to initiate a visual indication of the zone in which the illicit object may be present.

2. The system of claim 1, wherein the processing subsystem is operable to filter metallic objects associated with the transport device to scan the transport device without activating an alarm.

3. The system of claim 1, wherein the processing subsystem is further operable to filter metallic objects associated with the transport device in each zone.

4. The system of claim 1, wherein the transport device is essentially free of metal.

5. A system for scanning individuals for illicit objects, comprising:
   a wheeled user transport device, comprising:
      a frame,
      wheels coupled to the frame, and
      a user support coupled to the frame;
   a metal detector operable to scan the transport device without activating an alarm while being able to detect an illicit object on an individual being transported thereby;
   the metal detector comprises a localized metal detection subsystem; and
   the transport device comprises a guide set coupled to the frame, the guide set operable to orient the localized metal detection subsystem relative to the transport device.

6. The system of claim 5, wherein:
   the localized metal detection subsystem comprises a hand-held metal detection subsystem; and
   the guide set comprises guides located behind the user support, the guides orienting the localized metal detection subsystem so that, when engaged with the guides, it is generally parallel to the user support.

7. The system of claim 1, wherein the transport device comprises a horizontal user support, a vertical user support, lateral user supports, and lower user supports.

8. The system of claim 7, wherein the transport device comprises a wheelchair.

9. A system for scanning individuals for illicit objects, comprising:
   a wheeled user transport device, comprising:
      a frame,
      wheels coupled to the frame, and
      a user support coupled to the frame;
   wherein the transport device may be scanned by a metal detector without activating an alarm, but an illicit object on an individual being transported thereby may be detected; and
   a guide set coupled to the frame, the guide set operable to orient a localized metal detection subsystem relative to the transport device.

10. The system of claim 9, wherein the guide set comprises guides located behind the user support, the guides orienting a localized metal detection subsystem so that, when engaged with the guides, it is generally parallel to the user support.

11. The system of claim 10, wherein:
   the frame and the wheels are essentially free of metal;
   the user support comprise vinyl; and
   the guides comprise plastic.

12. The system of claim 10, wherein the guides comprise channels.

13. The system of claim 9, wherein the transport device comprises a horizontal user support, a vertical user support, lateral user supports, and lower user supports.

14. The system of claim 13, wherein the transport device comprises a wheelchair.

15. The system of claim 9, wherein the transport device is essentially free of metal.

16. A method for scanning individuals for illicit objects, comprising:
   receiving a signal representative of a metallic object;
   determining whether the represented metallic object is potentially illicit;
   determining whether the represented metallic object is associated with a wheeled user transport device;
   initiating an alarm if the represented metallic object is potentially illicit and is not associated with a wheeled user transport device; and
   determining whether the represented metallic object is associated with a wheeled user transport device comprises comparing object characteristics derived from the received signal to characteristics of components of a wheeled user transport device.

17. The method of claim 16, wherein receiving a signal representative of a metallic object comprises receiving a signal indicative of the size of a metallic object.

18. The method of claim 16, wherein determining whether the represented metallic object is potentially illicit comprises determining whether the received signal exceeds a threshold.

19. The method of claim 16, wherein comparing object characteristics derived from the received signal to characteristics of components of a wheeled user transport device comprises comparing the characteristics based on zones of a metal detector.

20. The method of claim 16, wherein initiating an alarm if the represented metallic object is potentially illicit and is not associated with a wheeled user transport device comprises generating an appropriate signal for an alarm subsystem.

21. A method for scanning individuals for illicit objects, comprising:
   scanning a wheeled user transport device and an individual being transported thereby for metallic objects;
   determining whether an illicit object may be present;
   scanning, if an illicit object may be present, a portion of the transport device and the individual for metallic objects;
   determining whether an illicit metallic object may be present in the scanned portions;
   scanning a portion of the transport device and the individual for metallic objects comprises generating a magnetic field with a localized metal detection subsystem and attempting to sense a disturbance in the magnetic field; and
   scanning a portion of the transport device and the individual for metallic objects comprises engaging the localized metal detection subsystem with a guide set to orient the subsystem relative to the transport device.

22. The method of claim 21, wherein scanning a wheeled user transport device and an individual being transported thereby for metallic objects comprises detecting disturbances in a magnetic field as the transport device and individual pass through the magnetic field.

23. The method of claim 21, wherein the wheeled user transport device is essentially free of metal.

24. The method of claim 21, wherein the wheeled user transport device comprises a wheelchair.

25. The method of claim 21, wherein determining whether an illicit object may be present comprises determining whether a signal representative of a metallic object exceeds a threshold.

26. The method of claim 21, wherein determining whether an illicit object may be present comprises filtering components associated with the transport device.

27. The method of claim 21, further comprising determining a zone in which a potential illicit object may be present.

28. The method of claim 21, further comprising scanning the portion of the individual being transported by touch in the proximity of the guide set if an illicit object may be present in the scanned portions.

29. The method of claim 21, wherein determining whether an illicit object may be present in the scanned portions comprises determining whether a signal representative of a metallic object exceeds a threshold.

30. A method for scanning individuals for illicit objects, comprising:
   scanning a wheeled user transport device and an individual being transported thereby for metallic objects;
   determining whether an illicit object may be present;
   wherein the transport device may be scanned without activating an alarm, but an illicit object on the individual device may be detected;
   scanning a portion of the transport device and the individual for metallic objects if an illicit object may be present;
   determining whether an illicit metallic object may be present in the scanned portions;
   scanning a portion of the transport device and the individual comprises generating a magnetic field with a localized metal detection subsystem and attempting to sense a disturbance in the magnetic field; and,
   scanning a portion of the transport device and the individual further comprises engaging the localized metal detection subsystem with a guide set to orient the subsystem relative to the transport device.

31. The method of claim 30, wherein scanning a wheeled user transport device and an individual being transported thereby for metallic objects comprises detecting disturbances in a magnetic field as the transport device and individual pass through the magnetic field.

32. The method of claim 30, wherein the wheeled user transport device is essentially free of metal.

33. The method of claim 30, wherein the wheeled user transport device comprises a wheelchair.

34. The method of claim 30, wherein determining whether an illicit object may be present comprises determining whether a signal representative of a metallic object exceeds a threshold.

35. The method of claim 30, further comprising determining, if an illicit object may be present, a zone in which the illicit object may be present and generating an indication of the zone in which the illicit object may be present.

36. The method of claim 30, wherein determining whether an illicit object may be present comprises filtering components associated with the transport device.

37. The method of claim 30, further comprising scanning the portion of the individual being transported by touch in the proximity of the guide set if an illicit object may be present in the scanned portions.

38. A method for scanning individuals for illicit objects, comprising:
   scanning a portion of a wheeled user transport device and an individual being transported thereby for metallic objects, wherein the transport device may be scanned without activating an alarm, but an illicit object on the individual may be detected;
   determining whether an illicit metallic object may be present in the scanned portions;
   scanning a portion of a wheeled user transport device and an individual being transported thereby for metallic objects comprises generating a magnetic field with a localized metal detection subsystem and attempting to sense a disturbance in the magnetic field; and
   scanning a portion of a wheeled user transport device and an individual being transported thereby for metallic objects comprises engaging the localized metal detection subsystem with a guide set to orient the subsystem relative to the transport device.

39. The method of claim 38, wherein scanning a portion of a wheeled user transport device and an individual being transported thereby for metallic objects comprises determining a zone in which an illicit object may be present and scanning the portion of the transport device and of the individual associated with the zone.

40. The method of claim 38, wherein the wheeled user transport device is essentially free of metal.

41. The method of claim 38, wherein the wheeled user transport device comprises a wheelchair.

42. The method of claim 38, further comprising scanning the portion of the individual being transported by touch in the proximity of the guide set if an illicit object may be present in the scanned portions.

43. The method of claim 38, wherein determining whether an illicit object may be present in the scanned portions comprises determining whether a signal representative of a metallic object exceeds a threshold.

44. A system for scanning individuals for illicit objects, comprising:
   a wheelchair, comprising:
      a frame,
      wheels coupled to the frame,
      a horizontal user support coupled to the frame,
      a vertical user support coupled to the frame,
      lateral user supports coupled to the frame, and
      lower user supports coupled to the frame,
      wherein the wheelchair is essentially free of metal;
   a metal detector, comprising:
      a base,
      a first sidewall coupled to the base,
      a second sidewall coupled to the base, wherein the base, first sidewall, and second sidewall form a passage,
      a first magnetic field generator housed in the first sidewall,
      a second magnetic field generator housed in the second sidewall, the magnetic field generators operable to generate a magnetic field in the passage,
      a plurality of magnetic field detectors housed in the first sidewall, each detector corresponding to a zone of the passage, the detectors operable to sense a disturbance in the magnetic field in the passage and to form a signal representative thereof,
      a plurality of magnetic field detectors housed in the second sidewall, each detector corresponding to a zone of the passage, the detectors operable to sense a disturbance in the magnetic field in the passage and to form a signal representative thereof; and
      a processing subsystem coupled to the magnetic field detectors, the subsystem operable to receive the formed signals from the detectors, to determine whether the represented metallic objects may be associated with components of the wheelchair in a particular zone, to determine whether the represented objects that are not associated with components of the wheelchair may be illicit, and to initiate a visual indication of the zone in which an illicit object may be located;
   wherein the transport device may be scanned by the metal detector without activating an alarm, but an illicit object on an individual being transported by the transport device may be detected.

* * * * *